United States Patent [19]

Anderson

[11] 4,161,730
[45] Jul. 17, 1979

[54] RADIO DETERMINATION USING SATELLITES TRANSMITTING TIMING SIGNALS WITH CORRECTION BY ACTIVE RANGE MEASUREMENT

[75] Inventor: Roy E. Anderson, Schenectady, N.Y.
[73] Assignee: General Electric Company, Schenectady, N.Y.
[21] Appl. No.: 842,402
[22] Filed: Oct. 17, 1977
[51] Int. Cl.² .............................................. G01S 5/12
[52] U.S. Cl. ................................ 343/6.5 R; 343/103; 343/100 ST; 343/112 R
[58] Field of Search ........ 343/100 ST, 112 R, 112 D, 343/103, 6.5 R

[56] References Cited

U.S. PATENT DOCUMENTS

| | | | |
|---|---|---|---|
| 3,384,891 | 5/1968 | Anderson | 343/100 ST |
| 3,430,234 | 2/1969 | Wright | 343/100 ST |
| 3,705,404 | 12/1972 | Chisholm | 343/103 |

Primary Examiner—Maynard R. Wilbur
Assistant Examiner—Lawrence Goodwin
Attorney, Agent, or Firm—Donald R. Campbell; Joseph T. Cohen; Marvin Snyder

[57] ABSTRACT

The time-of-arrival of timing signals transmitted by two satellites is measured relative to a crystal clock, and an approximate position fix is computed for the ship or other object being located. Because of clock error the position fixes are displaced along a hyperbolic line of position. A two-way active range measurement through a third satellite or one timing signal satellite enables computation of an independently determined line of position, the true position fix being at its intersection with the hyperbolic line of position. The clock error is corrected and the method of position fixing from two timing satellites is repeated until the clock drift exceeds acceptable limits. A continuous navigation service and also position surveillance are realized.

15 Claims, 5 Drawing Figures

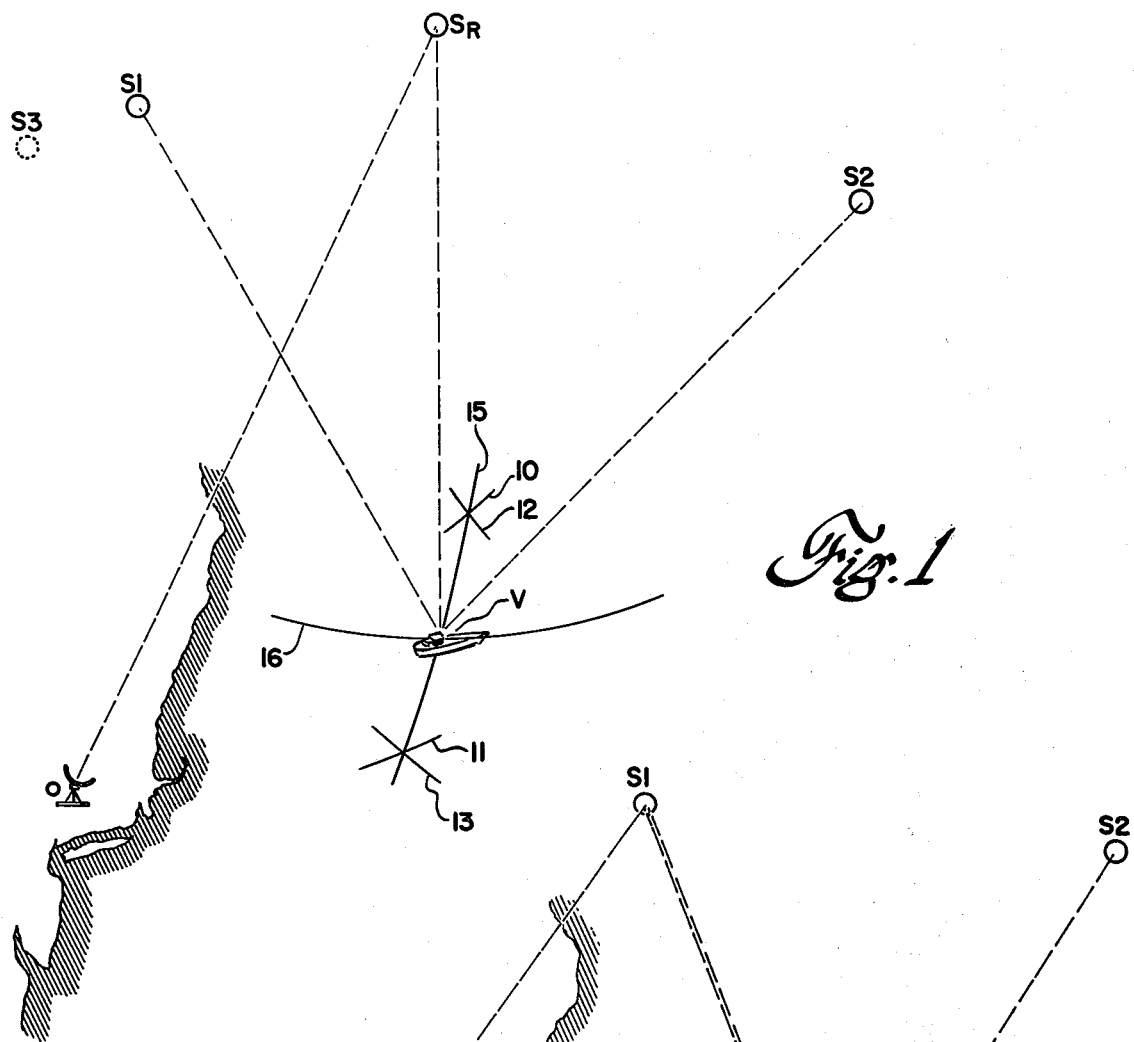
*Fig. 1*
*Fig. 2*
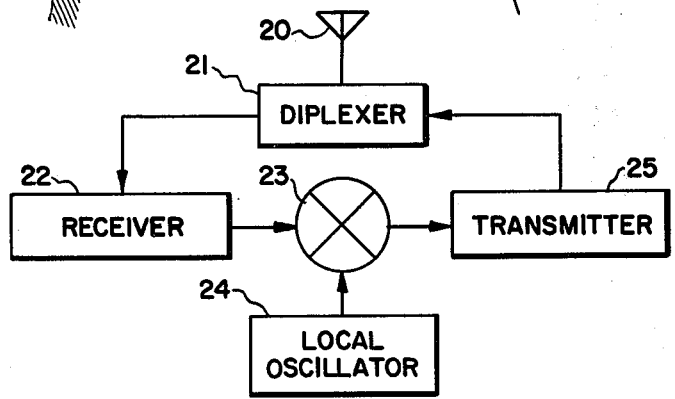
*Fig. 3*

RADIO DETERMINATION USING SATELLITES TRANSMITTING TIMING SIGNALS WITH CORRECTION BY ACTIVE RANGE MEASUREMENT

BACKGROUND OF THE INVENTION

This invention relates to radio determination by artificial earth satellites, and more particularly to a method of navigation or position surveillance using satellites transmitting timing signals with a correction by a two-way active ranging measurement. This method can provide a position fixing accuracy within a tenth nautical mile and requires user clock accuracy comparable to that of a crystal clock.

A need is recognized for continuous readout of position aboard a ship to enable the ship to steer for minimum fuel or minimum time. An object of this invention is to provide a system for ships that have a satellite communication system to also have the desired navigation service continuously and at low cost. Several presently known satellite systems do not have the capability for this navigation service on a worldwide basis or have some disadvantage. The planned Global Position Fixing System requires relatively expensive user equipment. The TRANSIT system could provide the service intermittently by providing accurate fix readouts and then using a dead reckoning computer between fixes, but the long time between fixes causes the dead reckoning computer to accumulate unacceptable errors. The Omega system will be worldwide and continuously available but does not have the desired 0.1 nautical mile accuracy. LORAN C can supply the service in limited areas, but worldwide coverage by LORAN C is not foreseen.

One-way ranging systems utilizing very accurate cesium beam clocks are described in the inventor's U.S. Pat. No. 3,384,891, which was granted on May 21, 1968 and is assigned to the assignee of this invention. Two geostationary satellites in view of an ocean basin each transmit a digital timing code continuously containing a timing signal such as a marker each second and information on the satellite location. A user of the signal who does not know his location but who has a clock accurately set to the time standard being transmitted by the satellite can measure the time of arrival of the signal relative to his clock and thus determine range from the satellite to himself. Radio signals travel at the speed of light, and the user can determine the travel time from the satellite to his location and thus a correction for propagation delay on the received time code signal. Knowing the exact position of the satellite, he can then determine a line of position. The use of two satellites enables him to determine his position fix at the intersection of the two lines of position from each of the two satellites. A very accurate clock is essential in such one-way ranging systems because an error of one microsecond in its time relative to the system reference standard will introduce an error of 1000 feet in the range measurement from the satellites. The cost of cesium beam clocks, which have an accuracy of 1 part in $10^{11}$ or better, would be excessive for this application.

The present invention makes possible a continuous navigation or position surveillance service with user crystal clocks and satellites that relay standard time signals, with an occasional active range measurement through an active ranging and communications satellite or timing signal satellite. Position surveillance by another method is disclosed and claimed in concurrently filed application Ser. No. 842,401 and in continuation-in-part application Ser. No. 899,117 filed on Apr. 24, 1978 by the inventor, which is assigned to the same assignee as this invention.

SUMMARY OF THE INVENTION

The need for a high accuracy clock on board the ship, aircraft, land vehicle or other object being located is eliminated by substituting a clock correction drived from a two-way active range measurement, made through a separate active ranging satellite or through one of the timing signal satellites. With an occasional active range measurement to correct the user's clock, the user can have a low cost crystal clock or other clock with a stability usually less than 1 part in $10^{10}$ to measure the time interval between transmission of a time signal and its reception by the user.

The preferred embodiment for navigation utilizes three earth satellites, two of which simultaneously repeat timing signals that are received at the object being located. The time-of-arrival of each time signal with respect to the crystal clock is measured to thereby derive the one-way ranging times, and the approximate position fix is computed from the known satellite locations and the ranges. Due to the clock error, which is the same for both range measurements, the approximate fixes are displaced along a hyperbolic line of position which can be determined geometrically from the satellite locations and known limits of acceptable clock error. To determine the true position fix, an independently determined line of position for the object is established by making a two-way active ranging measurement through an active ranging (and communications) satellite. A timing signal is transmitted from a ground station through the active ranging satellite to the object being located, then back through the satellite to the ground station (or vice versa). Knowing the elapsed time interval and ground station and active ranging satellite locations, the independently measured line of position is computed. The intersection of the hyperbolic line of position and independently measured line of position is the true position fix. The clock error is determined from the distance between the approximate and true position fixes, and the clock is reset.

Modifications of the preferred embodiment are that the two-way active range measurement can be made through a timing signal satellite and that an additional timing signal satellite is needed (i.e., a total of four) if a position fix as to altitude as well as longitude and latitude is required. A second embodiment utilizes only two satellites, one being a timing signal satellite, and the other being either an active ranging satellite or a timing signal satellite having a dual function capability.

Other modifications are described including a method of position surveillance in which the independent line of position is computed at the ground station, and the time interval measurements are transmitted from the ship to the ground station for computation of the approximate and true position fixes at the ground station. After calculation of the clock error, a message with the information is sent to the object being located.

The timing signal satellites are preferably standard time distribution satellites such as the GOES or WWVS satellites. Continuous position fixes can be performed between the occasional clock corrections to an accuracy within 0.1 nautical mile.

BRIEF DESCRIPTION OF THE DRAWINGS

FIG. 1 is a sketch illustrating one embodiment of the navigation method employing three satellites, two of which transmit time signals while the third is an active ranging and communication satellite, further showing in dashed lines a fourth satellite for a position fix including altitude;

FIG. 2 is a sketch illustrating another embodiment of the navigation method employing two satellites, one a timing signal satellite and the other either a timing signal satellite or active ranging and communications satellite with a dual function;

FIG. 3 is a block diagram of a satellite transponder;

DESCRIPTION OF THE PREFERRED EMBODIMENTS

Figure 4:
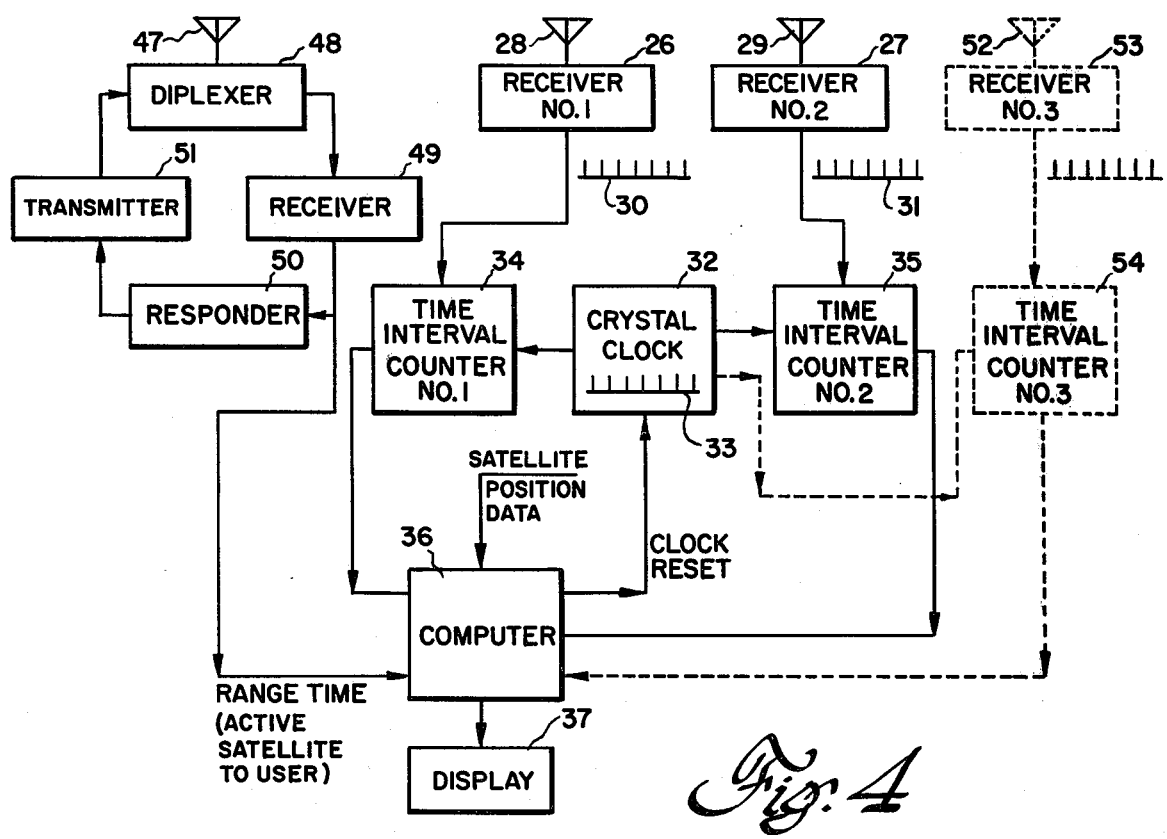
FIG. 4 is a block diagram of user electronic equipment on the ship or other object being located.

As compared to prior art methods of navigation by satellite utilizing at least two active ranging and communications earth orbiting satellites or a high accuracy cesium beam clock enabling the user to have an accurate time reference, navigation by satellite is achieved with a user clock have a stability of about 1 part in $10^{10}$, typical of a good but low cost crystal oscillator clock, and no more than one active ranging satellite is required. The need for a high accuracy user clock is eliminated by substituting a correction derived from an active range measurement through a satellite, either a geostationary satellite used for standard time distribution or a separate active ranging and communications satellite. With an occasional active range measurement from a geostationary satellite to correct the user's clock, the user may substitute a low cost crystal oscillator clock for the high accuracy cesium beam clock. The user or object being located can be a sea-going ship, an aircraft, a weather balloon, an ocean buoy, a truck or other land vehicle, or even a person, providing the user has appropriate electronic equipment. The method of radio determination (defined as position fixing by the use of radio signals) applies to both navigation and position surveillance, but in the following description navigation is explained and the object being located is assumed to be an ocean-going ship.

The preferred embodiment for continuous navigation service by satellites illustrated in FIG. 1 utilizes three artificial satellites, two of which are timing signal satellites while the third is an active ranging and communication satellite. Timing signal satellites S1 and S2 are preferably geostationary satellites that relay standard time signals as the National Bureau of Standards now does through the GOES satellites, and is considering doing through a future WWVS satellite. The GOES time signals are transmitted with a very narrow bandwidth and may not provide the resolution that is required for accurate ship navigation, but the contemplated service designated WWVS which the National Bureau of Standards is considering for distribution of timing signals by satellite will provide high accuracy and high precision timing signals that will be available continuously and as conveniently as the GOES signals are now. The timing satellites have transponder equipment for receiving and transmitting a digital timing code having a time marker that can be used to measure time of arrival of the signals at the user vessel. The invention can be realized with any signal waveform which can transmit an identifiable timing signal, and for clarity the timing signals are referred to as "time ticks" occurring at precisely measured one second intervals.

The ocean going vessel V is equipped with a shipboard terminal for satellite communications, as in the operational MARISAT system, and is also equipped with receivers for receiving the time code signals from the two time standard satellites S1 and S2, a good crystal clock having a stability of about 1 part in $10^9$ or $10^{10}$, time interval counters for measuring the propagation path time delays, and a small computer and display. The time interval counters receive the clock signals from the crystal clock and the time signals from the two time standard satellites, and measures separately the time interval from the received timing pulse to the crystal clock timing pulse, or vice versa, for each of the two satellites. The two time intervals, both a specific number of microseconds and tenths of microseconds or nanoseconds, represent the one-way ranging times. The propagation time of the timing signals is converted to a range measurement by relating it to the known propagation velocity of the radio signals. The positions of timing signal satellites S1 and S2 are known, either by transmitting with the time code signals information on the instantaneous satellite position or by trilateration. Knowing the positions of the two satellites and the time intervals for radio signals to travel from the satellites to the ship, the computer determines the ship line of position derived from each satellite location in space and the range from each satellite to the ship. The intersection of the two lines of position is the ship's position fix.

As the crystal clock drifts, the lines of position determined from the satellites will change from their correct values. The drift of the clock is usually in one direction, i.e., the clock runs fast or slow, but there are perturbations and variations with temperature. The same error, however, occurs on both range measurements and the effect is to displace the position fixes along a hyperbolic line of position in a direction that can be determined geometrically from the locations of the satellites. This is illustrated schematically in FIG. 1. Depending upon the amount of the clock error and assuming that the clock error is kept within pretermined limits, the ship line of position with respect to satellite S1 is between lines 10 and 11, and the ship line of position with respect to satellite S2 is between lines 12 and 13. The hyperbolic line of position, having a length determined by the clock error, is indicated at 15, and along this line of position the difference of the ranges to satellites S1 and S2 is constant. The true ship location on hyperbolic line of position 15 is not known unless an independent measurement is made.

The independent measurement is made by an active range measurement from an active ranging and communication satellite $S_R$. The communications capability of this satellite is not utilized for this application, but it is appreciated that ship communication by satellite is desirable to conduct business, and to transmit weather forecasts, emergency information, etc. The active ranging interrogation is initiated from a ground or earth station O whose location (longitudinal and latitudinal) is precisely known, but may also be initiated from the ship. The high accuracy tone-code ranging technique is preferred, but any technique that can transmit a time marker on a radio signal is suitable including pseudorandom ranging and multiple side tone ranging. Tone-code ranging is described in the article "Communications and Position Fixing Experiments Using the ATS Satellites" by the inventor, *Navigation*, Vol. 20, No. 4, Winter 1973-74. The active ranging signal originating at ground station O is relayed by transponder equipment on satellite $S_R$ to ship V, and then is retransmitted from the ship through satellite $S_R$ back to ground station O. At the ground station the time interval in microseconds and tenths of microseconds is measured from the initial transmission of the ranging interrogation to its return from the satellite as relayed back from the ship. The elapsed time interval is twice the ranging time from ground station to satellite plus twice the ranging time from satellite to ship. Knowing the exact locations of the ground station O and satellite $S_R$, the ranging time from earth station to satellite is also known and can be subtracted off, and the result divided by two to give the one-way ranging time from satellite $S_R$ to ship V. The computer on the ship after receiving two-way ranging time information from the ground station now computes a line of position 16 for the ship with respect to active ranging and communications satellite $S_R$; alternatively the independently determined line of position is computed at the ground station and the information transmitted to the vessel. All the lines of position are actually a segment of a circle on the surface of the earth having a center on a line extending between the satellite and the center of the earth. The line of position 16 in turn is used by the ship's computer to determine the crossing of the independently determined line from active ranging and communications satellite $S_R$ and hyperbolic line of position 15. The true position of ship V then is the intersection of hyperbolic line of position 15 and line of position 16 derived by a two-way active range measurement from satellite $S_R$.

The clock error is easily computed from the approximate position fix derived from timing signal satellites S1 and S2 and the true position fix derived by the active ranging measurement from satellite $S_R$ and its intersection with line of position 15. The error in seconds is equal to the distance between approximate and true position fixes multiplied by the cosine of the angle of elevation to the satellite, and divided by the velocity of light. The shipboard crystal clock is now corrected and need not be recorrected until the clock error becomes larger than can be tolerated, such as every half hour. Continuous position fixes can be made in the meantime from the timing signal satellites and the shipboard crystal clock, and can be approximately corrected if the previous pattern of clock errors is known. As a modification of the method of navigation by satellites, the ship line of position 16 derived from the two-way active range measurement through satellite $S_R$ can be computed at the shore station and transmitted to the ship, rather than being computed on shipboard.

Another modification of the basic method employing three satellites, of which two are timing signal satellites, is that a third timing signal satellite S3, illustrated in dashed lines in FIG. 1, is needed when the position fix derived from the timing signal satellites includes altitude as well as longitude and latitude. Airborne objects being located such as an aircraft or a balloon often have an altimeter or other instrument for independently determining altitude, but this can be done by measuring the one-way ranging times from three widely spaced satellites and computing a line of position from each, the intersection of the three lines of position being the approximate position fix. An additional two-way active ranging measurement to compute the line of position with respect to active ranging and communication satellite $S_R$ is required for periodic clock correction. An alternative technique not requiring fourth timing signal satellite S3 is that active ranging and communication satellite $S_R$ acts in a double duty capacity and also relays a timing signal to ship V. Using only three satellites, there are three timing signals whose time of arrival relative to the crystal clock is measured, enabling the calculation of three intersecting lines of position to give the approximate position fix. Satellite $S_R$ is also used in the two-way active range measurement for determining a true position fix and clock correction. For further information on one-way ranging measurements from three satellites for a position fix for altitude as well as longitude and latitude, two-way active ranging measurements by satellite, and appropriate electronic equipment at the ground station, satellite and user craft to make these measurements, refer to the previously mentioned U.S. Pat. No. 3,384,891, the disclosure of which is incorporated herein by reference.

The second embodiment of the invention shown in FIG. 2 utilizes only two geostationary satellites, one a timing signal satellite and the other either a timing signal satellite or an active ranging and communication satellite. One of the two satellites has a double function of relaying standard time signals and also repeating the active ranging interrogation and relaying the ship's response back to the ground station. To briefly review the operation assuming that the two satellites are timing signal satellites S1 and S2, one-way ranging measurements from each satellite to vessel V are made by separately measuring the time of arrival of the timing signals relative to the crystal clock. The computer determines the ship line of position derived from each satellite location in space and the range from each satellite to the ship, and the intersection of the two lines of position is the ship's approximate position fix. As the crystal clock drifts, the same error occurs on both range measurements and the approximate position fix is displaced along hyperbolic line of position 15 in a direction that can be determined geometrically from the locations of the satellites and known limits of acceptable clock error. The true position fix is determined by an independently performed two-way active ranging measurement made through a transponder on timing signal satellite S1. An active ranging interrogation initiated by ground station O is repeated by S1, received on ship V, retransmitted back to S1, and relayed by S1 to ground station O. The time interval between initial transmission of the ranging interrogation time marker and the return from ship V through satellite S1 is measured, and this time interval is transmitted to the ship through S1. The active range measurement derives the range from satellite S1 to vessel V. Knowing the exact location of the ground station and satellite S1, and also the range from the timing satellite to the ship, the independent line of position 16 for the vessel can be calculated. The intersection of independently measured line of position 16 and hyperbolic line of position 15 is the true position fix of vessel V. The clock error is dependent upon the distance between the approximate position fix and the true position fix, and the crystal clock is reset to correct the error. When the correction has been made, the procedure for computing the ship's position continuously from the timing signal satellites may continue until it is believed that the clock has again drifted off to the limit of acceptable accuracy. Satellites S1 and S2 are preferably standard time distribution satellites such as the GOES or WWVS satellites, or one can be an active ranging and communications satellite with provision for relaying the standard time signals. A third satellite is required if the position fix is to include altitude, longitude, and latitude.

In the foregoing discussion the internal time delays in the electronic equipment have not been mentioned, but such time delays are known, can be estimated, or can be measured. Automatic and remote measurement of the internal time delay of an unmanned transponder is described in allowed application Ser. No. 562,499 filed on Mar. 27, 1975 by the inventor jointly with J. R. Lewis and A. F. Briskin, now U.S. Pat. No. 4,042,926, entitled "Automatic Transponder" and assigned to the National Aeronautics and Space Administration. Precision range measurements and position fixes necessitate that correction be made for internal time delays as is known in the art.

Figure 5:
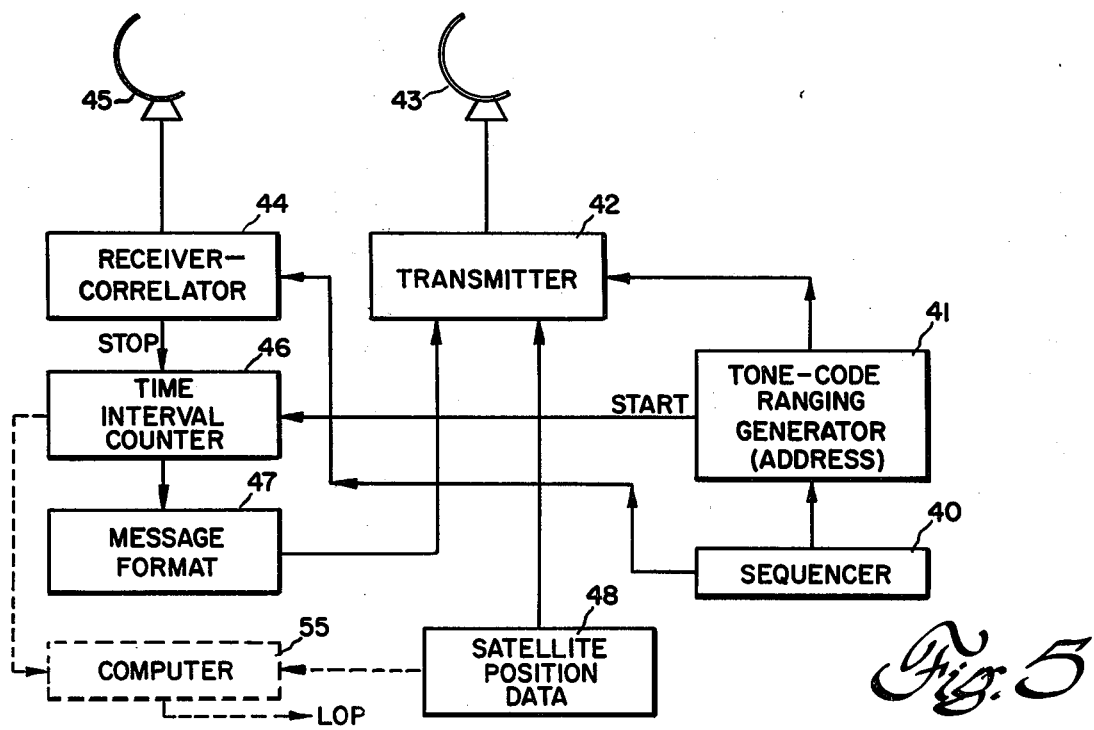
FIG. 5 is a block diagram of the ground station electronic equipment.

FIGS. 3, 4, and 5 are block diagrams of typical electronic equipment on the satellite, on shipboard, and at the ground station in order to practice the present methods of satellite navigation. The basic transponder apparatus on a timing signal satellite or an active ranging and communications satellite for receiving a digital timing code or active ranging interrogation and immediately retransmitting the radio signal is given in FIG. 3. The radio wave is received by an antenna 20, passes through a diplexer 21 to a receiver 22, and is then combined in a mixer 23 with an intermediate frequency generated by a local oscillator 24. The mixer output signal has a different frequency than the received signal and passes through a transmitter 25 back to diplexer 21 and antenna 20 to be radiated.

FIG. 4 illustrates in simplied form the electronic system aboard ship for any of the principal embodiments of the continuous navigation service by means of either two or three satellites, further showing in dashed lines the additional apparatus needed for a position fix including altitude. This equipment can be unmanned, or at best requires a minimum of operator attention. FIG. 4 (and also FIG. 5) will be discussed with regard to the preferred embodiment in FIG. 1 employing timing signal satellites S1 and S2 and active ranging and communications satellite $S_R$. First and second receivers 26 and 27 with antennas 28 and 29 separately receive the timing signals from S1 and S2, transmitted at one second intervals or other standard time intervals. The outputs of receivers 26 and 27 are consequently trains of equally spaced received timing pulses 30 and 31 which are produced continuously. A low cost quartz crystal oscillator clock 32 of conventional construction also generates on a continuous basis a train of crystal clock timing pulses or signals 33 at one second intervals or at the rate of the satellite timing signals. Because of the clock error, clock timing pulses 33 may not be exactly coincident with the standard timing signals being transmitted from satellites S1 and S2. Clock timing pulses 33 are fed to time interval counters 34 and 35 and trigger the counters into operation. Time interval timer 34 also has an input from first receiver 26, and the next occurring received timing pulse 30 stops the counter and gates the measured time interval in microseconds and tenths of microseconds to a computer 36. The measured time interval is therefore the time of arrival of the timing signal relative to the crystal clock, and is the one-way ranging time from satellite S1 to the ship. Time interval counter 35 in similar fashion is started by clock timing pulse 33 and stopped by the next received timing pulse 31, thereby measuring the propagation path time delay or one-way ranging time from satellite S2 to the ship. Counters 34 and 35 are now reset to repeatedly measure the time of arrival of the timing signals relative to crystal clock 32.

The computer calculates a line of position for the ship from each satellite from the location of each satellite in space and the range from each satellite to the ship. Satellite position data can be included, along with the address of the satellite, in the digital timing code information transmitted from the satellite and received by the ship. Standard time distribution satellites such as the GOES or WWVS satellite are tracked by the owners who can thus transmit ephemeris data, i.e., information on orbital parameters from which the satellite position can be determined, or can transmit position in longitude, latitude, and earth center distance. Alternatively, the satellite position data can be transmitted from the ground station, where the satellite position can be computed by trilateration. In trilateration the range from three widely spaced ground stations, two of which can be unmanned, are measured, and the unique satellite position is computed from the three ranges and the known locations of the ground stations. Having computed the two lines of positions from the timing signal satellites to the ship, the approximate position fix of the ship is at the intersection of the two lines of position. A display device 37 such as a cathode ray tube or printer provides a continuous visual display of the ship's position. Calculation of hyperbolic line of position 15, from the known satellite locations through the approximate position fix, is routine.

The independently determined line of position 16 for vessel V made by a two-way active range measurement through active ranging and communications satellite $S_R$ is made by initiating an active ranging interrogation from ground station O. In FIG. 5, a sequencer 40 for rotating the tone-code ranging interrogation among a number of active ranging satellites actuates a tone-code ranging generator 41 to produce a digital timing code signal which includes the time marker and also the address of ship V. This ranging interrogation passes through a transmitter 42 to a tracking antenna 43. Sequencer 40 also actuates a correlator in receiver 44 which functions to recognize the address in the received signal retransmitted from the ship through the active ranging satellite back to a receiving antenna 45 at the ground station. The tone-code ranging interrogation is also fed to a time interval counter 46 and the time marker starts operation of the counter.

On the ship (see FIG. 4), the tone-code ranging interrogation after being relayed by satellite $S_R$ is received by antenna 47 and passes through a diplexer 48 and receiver 49 to a responder 50. The responder automatically initiates retransmission of the active ranging interrogation signal through transmitter 51, diplexer 48, and antenna 47. The retransmitted tone-code ranging interrogation signal is now relayed by satellite $S_R$ back to the ground station, where it is received by antenna 45 (FIG. 5) and fed to receiver 44 and the address recognized by the correlator. The time marker in the received ranging signal stops operation of time interval counter 46, and the elapsed time interval in microseconds and tenths of microseconds or nanoseconds is fed to a message format circuit 47 and then back to transmitter 42.

As may be required, satellite position data is read out of a storage unit 48 to transmitter 42, and the digital message transmitted through satellite $S_R$ back to the ship includes the elapsed time interval representing the two-way active ranging time and the address of the ship, as well as the needed satellite position data. Computer 55 is added if the independent line of position (LOP) is to be computed at the ground station rather than at the vessel. On vessel V (FIG. 4), the digital message comprising the elapsed time interval is fed through antenna 47, diplexer 48, and receiver 49 to computer 36. From the elapsed time interval representing the two-way active ranging time, and knowing the position of ground station O and satellite $S_R$, the computer by routine calculations is able to compute the one-way ranging time from satellite $S_R$ to ship V and also the independently measured line of position 16. The intersection of hyperbolic line of position 15 with line of position 16 (see FIG. 1) is the true position fix of the ship. The crystal clock error is easily calculated from the speed of light, the angle of elevation to the satellite, and the distance error between the approximate and true position fixes. A clock reset signal generated by computer 36 corrects crystal clock 32.

In the event that position fixes with altitude, longitude, and latitude are required, the receiver components shown in dashed lines are added to the shipboard electronic equipment. These are antenna 52, receiver 53, and time interval counter 54. The counter is started simultaneously with counters 34 and 35 by a crystal clock timing pulse 33, and is stopped by the next received timing pulse from receiver 53. The measured time interval represents the one-way ranging time from third timing signal satellite S3 (FIG. 1), and is supplied to computer 36 along with position data for satellite S3 to compute another ship line of position.

Several modifications of the foregoing methods of navigation by satellite will now be discussed. Independent line of position 16, as was previously mentioned, can be computed at the ground station and the information then transmitted back to the ship. Also, the active range interrogation can originate on the vessel and be relayed by the active ranging satellite to an automatic transponder at a known ground location, and back through the satellite to the vessel, and the independent line of position is then computed on the vessel. Within the scope of the invention as broadly defined, independent line of position 16 may be determined from a two-way active range measurement from the vessel to a satellite at a known location. That is, the range interrogation signal is transmitted from vessel to satellite, and relayed from satellite to vessel to derive the two-way ranging time. Knowing the satellite location and the range from satellite to vessel, independent line of position 16 can be computed.

A method of position surveillance, i.e., tracking the object or ship location at the shore station, is another aspect of the invention. To implement the surveillance system, the time interval measurements from the timing signal satellites representing the two one-way ranging times are transmitted from ship to ground station, where the approximate position fix and hyperbolic line of position 15 are calculated. The two-way active range measurement is made by a ranging interrogation signal transmitted from the ground station through the satellite to the ship and back through the satellite to the ship. Independent line of position 16 is next computed at the ground station, and its intersection with hyperbolic line position 15 determined, which is the true fix. The clock error is computed periodically and sent as a message to the ship for correction of the onboard clock.

The invention can be used with a system such as the commercially operational MARISAT system without modification of the system as it now exists. Vessels that are to be located will add the necessary receiver for the timing signals from the time distribution satellites, and a tone-code ranging responder to their existing shipboard MARISAT terminal. The active range measurement can be accomplished by a receive only earth station separate from the MARISAT earth station. To accomplish the measurement, the separate earth station calls the ship by telephone in the usual manner for voice communication. It then sends the ship's tone-code ranging interrogation over the telephone line, and listens to the MARISAT satellite at L-band to determine the time the interrogation is sent by the satellite to the ship, starting a time interval counter at the time the L-band interrogation signal is received. It listens at C-band and stops the counter when the satellite relays the return from the ship to the MARISAT ground station. The interval is the two-way propagation time from the MARISAT satellite to the vessel plus the known time delay within the shipboard equipment. Subtracting the known delay, dividing by two and dividing by the velocity of light yields the range from satellite to vessel. The information is transmitted to the vessel and used to determine independent line of position 16.

In summary, the need for a high accuracy clock on the vessel, aircraft, land vehicle, or other object being located is eliminated by substituting a correction derived from a two-way active range measurement through a geostationary satellite, either a separate active ranging and communications satellite or one that is used for time distribution. With an occasional range measurement from a geostationary satellite to correct the user's clock, the user may substitute a low cost crystal oscillator for the expensive high accuracy clock. The invention has utility with clocks of greater accuracy, with a stability better than one part in $10^{10}$, for then the clock correction need be made at less frequent intervals. Further, there are many different types of clocks other than crystal clocks that can be employed in the practice of the invention. A continuous navigation service with a continuous readout of position is possible at relatively low cost, or position surveillance at the ground station.

While the invention has been particularly shown and described with reference to several preferred embodiments thereof, it will be understood by those skilled in the art that the foregoing and other changes in form and details may be made therein without departing from the spirit and scope of the invention.

The invention claimed is:

1. A method of radio determination using a plurality of earth satellites having known locations and including satellites that simultaneously transmit timing signals at precisely known intervals, comprising the steps of receiving at an object being located the timing signals transmitted by first and second satellites and measuring the time-of-arrival of each timing signal with respect to a clock to derive the one-way ranging times and therefore the ranges from said first and second satellites to the object, computing the approximate position fix of the object from the known locations of said first and second satellites and the ranges, and also computing from the satellite locations a hyperbolic line of position for the object extending through the approximate position fix and along which the approximate position fix is displaced by clock error, independently determining a line of position of the object by performing a two-way active range measurement made through an earth satellite, determining the true position fix of the object at the intersection of said hyperbolic line of position and independently determined line of position, and resetting said clock to correct for the clock error which is dependent upon the distance between the approximate and true position fixes.

2. The method of claim 1 wherein the step of independently determining a line of position for the object comprises making a two-way active range measurement between said ground station, a third satellite and the object to derive, from the elapsed time interval and known locations of said ground station and third satellite, the one-way ranging time and therefore the range from said third satellite to the object, and then computing the independently determined line of position from the location of said third satellite and range to the object.

3. The method of claim 1 wherein the step of independently determining a line of position for the object comprises making a two-way active range measurement between said ground station, said first satellite and the object to derive, from the elapsed time interval and known locations of said ground station and first satellite, the one-way ranging time and therefore the range from said first satellite to the object, and then computing the independently determined line of position from the location of said first satellite and range to the object.

4. The method of claim 1 further including the step of receiving at the object being located the timing signal transmitted by a third satellite and measuring the time-of-arrival of the timing signal with respect to said clock to derive the one-way ranging time and therefore the range from said third satellite to the object, and computing the approximate position fix of the object in altitude, longitude, and latitude from the known locations of said first, second, and third satellites and the ranges.

5. The method of claim 1 wherein the steps of receiving timing signals, measuring the time-of-arrival of the timing signals, and computing the approximate position fix of the object are repeated for a period of time during which the clock is within acceptable limits of accuracy.

6. The method of claim 5 wherein said first and second satellites are time distribution satellites transmitting said timing signals at precise one second intervals, said clock is a crystal oscillator clock generating clock pulses at one second intervals, and the step of measuring the time-of-arrival of said timing signals with respect to the clock comprises starting and stopping time interval counters with corresponding clock pulses and timing signals to thereby generate the one-way ranging times.

7. A method of navigation using a plurality of earth satellites having known locations and including satellites that simultaneously transmit timing signals at precisely known intervals, comprising the steps of receiving at an object being located the timing signals transmitted by first and second satellites and measuring the time-of-arrival of each timing signal with respect to a clock having a stability not exceeding one part in $10^{10}$ to derive the one-way ranging times and therefore the ranges from said first and second satellites to the object, computing the approximate position fix of the object from the known locations of said first and second satellites and the ranges, and also computing from the satellite locations a hyperbolic line of position for the object extending through the approximate position fix and along which the approximate position fix is displaced by clock error, independently determining a line of position of the object and transmitting information thereon to the object by making a two-way active range measurement by transmitting a ranging signal having a time marker from a ground station through a third satellite to the object and then back through said third satellite to the ground station to derive, from the elapsed time interval and known locations of said ground station and third satellite, the one-way ranging time and therefore the range from said third satellite to the object, and then computing the independently determined line of position from the location of said third satellite and range to the object, determining the true position fix of the object at the intersection of said hyperbolic line of position and independently determined line of position, and resetting said clock to correct for the clock error which is dependent upon the distance between the approximate and true position fixes.

8. The method of claim 7 further including the step of receiving at the object being located the timing signal transmitted by a fourth satellite and measuring the time-of-arrival with respect to said crystal clock to thereby derive the one-way ranging time and therefore the range from said fourth satellite to the object, and computing the approximate position fix of the object in altitude, longitude, and latitude from the known locations of said first, second, and fourth satellites and the ranges.

9. The method of claim 7 wherein the steps of receiving timing signals, measuring the time-of-arrival of the timing signals with respect to said clock, and computing the approximate position fix of the object are repeated without a clock correction for a period of time during which said clock is within acceptable limits of accuracy.

10. The method of claim 9 wherein the step of independently determining a line of position of the object includes transmitting the elapsed time interval between transmission and reception of the ranging signal time marker at the ground station, back through said third satellite to the object being located where the independent line of position is computed.

11. The method of claim 10 wherein said first and second satellites are time distribution satellites transmitting said timing signals at precise one second intervals, and the step of measuring the time-of-arrival of said timing signals with respect to said clock comprises starting and stopping a time interval counter with corresponding clock pulses and timing signals to thereby generate the one-way ranging times.

12. A method of navigation using a plurality of earth satellites having known locations and including satellites that simultaneously transmit timing signals at precisely known intervals, comprising the steps of receiving at an object being located the timing signals transmitted by first and second satellites and measuring the time-of-arrival of each timing signal with respect to a clock having a stability not exceeding one part in $10^{10}$ to derive the one-way ranging times and therefore the ranges from said first and second satellites to the object, computing the approximate position fix of the object from the known locations of said first and second satellites and the ranges, and also computing from the satellite locations a hyperbolic line of position for the object extending through the approximate position fix and along which the approximate position fix is displaced by clock error, independently determining a line of position for the object and transmitting information thereon to the object by making a two-way active range measurement by transmitting a ranging signal having a time marker from a ground station through said first satellite to the object and back through said first satellite to the ground station to derive, from the elapsed time interval and known locations of said ground station and first satellite, the one-way ranging time and therefore the range from said first satellite to the object, and then computing the independently determined line of position from the location of said first satellite and range to the object, determining the true position fix of the object at the intersection of said hyperbolic line of position and independently determined line of position, and resetting said clock to correct for the clock error which is dependent upon the distance between the approximate and true position fixes.

13. The method of claim 12 wherein the steps of receiving timing signals, measuring the time-of-arrival of the timing signals with respect to said clock, and computing the approximate position fix of the object are repeated without a clock correction for a period of time during which said clock is within acceptable limits of accuracy.

14. The method of claim 13 wherein the step of independently determining a line of position of the object includes transmitting the elapsed time interval between transmission and reception of the ranging signal time marker at the ground station, back through said first satellite to the object being located where the independent line of position is computed.

15. The method of claim 13 wherein said timing signals are transmitted at precise one second intervals, and said clock generates clock pulses approximately at one second intervals, and the step of measuring the time-of-arrival of said timing signals with respect to said clock comprises starting and stopping a time interval counter with corresponding clock pulses and timing signals to thereby generate the one-way ranging times.

* * * * *